(12) United States Patent
Bjerre et al.

(10) Patent No.: US 11,983,589 B2
(45) Date of Patent: May 14, 2024

(54) METHOD FOR AMENDING A FINGERPRINT TEMPLATE OF A SMART CARD

(71) Applicant: Fingerprint Cards Anacatum IP AB, Gothenburg (SE)

(72) Inventors: Troels Bjerre, Valby (DK); Anders Ø. Nielsen, Frederiksberg (DK)

(73) Assignee: Fingerprint Cards Anacatum IP AB, Gothenburg (SE)

( * ) Notice: Subject to any disclaimer, the term of this patent is extended or adjusted under 35 U.S.C. 154(b) by 0 days.

(21) Appl. No.: 17/772,209

(22) PCT Filed: Oct. 29, 2020

(86) PCT No.: PCT/SE2020/051050
§ 371 (c)(1),
(2) Date: Apr. 27, 2022

(87) PCT Pub. No.: WO2021/086258
PCT Pub. Date: May 6, 2021

(65) Prior Publication Data
US 2022/0398423 A1 Dec. 15, 2022

(30) Foreign Application Priority Data
Nov. 1, 2019 (SE) .................................... 1951252-4

(51) Int. Cl.
*G06K 19/06* (2006.01)
*G06K 19/073* (2006.01)
(52) U.S. Cl.
CPC .............................. *G06K 19/07354* (2013.01)
(58) Field of Classification Search
CPC ........... G06Q 20/40145; G06Q 20/341; G06Q 20/20; G06Q 20/40; G06Q 20/3674; G06Q 20/401; G06Q 20/382; G06K 19/06046; G06K 2019/06253; G06K 19/07354
USPC .................................................. 235/492, 380
See application file for complete search history.

(56) References Cited

U.S. PATENT DOCUMENTS

| | | |
|---|---|---|
| 2005/0139685 A1 | 6/2005 | Kozlay |
| 2018/0101718 A1 | 4/2018 | Lowe et al. |
| 2018/0276519 A1 | 9/2018 | Benkley, III et al. |
| 2019/0251236 A1* | 8/2019 | Lowe ................. G06V 40/1365 |

(Continued)

FOREIGN PATENT DOCUMENTS

| | | |
|---|---|---|
| GB | 2563599 A | 12/2018 |
| SE | 1750172 A1 | 8/2018 |

(Continued)

OTHER PUBLICATIONS

PCT International Search Report and Written Opinion dated Feb. 4, 2021 for International Application No. PCT/SE2020/051050, 13 pages.

(Continued)

*Primary Examiner* — Daniel St Cyr
(74) *Attorney, Agent, or Firm* — RMCK Law Group, PLC (57) ABSTRACT

The present disclosure relates to a method of amending a fingerprint template for a user of a smart card, where the user of the smart card is progressively enrolling based on comparison and/or using a separate credential such as a PIN code. The present disclosure also relates to a corresponding smart card and to a computer program product.

13 Claims, 3 Drawing Sheets

(56) References Cited

U.S. PATENT DOCUMENTS

2020/0311509 A1\* 10/2020 Benkley, III ............ G06F 21/32
2021/0397813 A1\* 12/2021 Lee ........................ G06N 20/00
2023/0008004 A1\* 1/2023 Aoki ........................ G06T 7/00

FOREIGN PATENT DOCUMENTS

WO     2017003356 A1     1/2017
WO     2018151647 A1     8/2018

OTHER PUBLICATIONS

Extended European Search Report dated Nov. 8, 2022 for EP Application No. 20881447.5, 6 pages.

\* cited by examiner

METHOD FOR AMENDING A FINGERPRINT TEMPLATE OF A SMART CARD

CROSS-REFERENCE TO RELATED APPLICATIONS

This application is a 371 U.S. National Stage of International Application No. PCT/SE2020/051050, filed Oct. 29, 2020, which claims priority to Swedish Patent Application No. 1951252-4, filed Nov. 1, 2019. The disclosures of each of the above applications are incorporated herein by reference in their entirety.

TECHNICAL FIELD

The present disclosure relates to a method of amending a fingerprint template for a user of a smart card, where the user of the smart card is progressively enrolling based on comparison and/or using a separate credential such as a PIN code. The present disclosure also relates to a corresponding smart card and to a computer program product.

BACKGROUND

The use of biometric techniques to identify and/or authenticate the identity of a user is increasing. Biometric techniques that are promoted for this use include voice, fingerprint, iris, vein pattern and other scans. Currently, the use of fingerprint sensors for capturing a fingerprint has shown to be specifically promising, for example due to its ease of integration with different types of electronic equipment, such as smartphones, watches, tablets, or any other type of electronic devices where personalized user interaction is advantageous.

In the above typical prior-art examples of electronic equipment having an integrated fingerprint sensor, the electronic equipment is generally provided with some form of graphical user interface (GUI) for instructing the user on how to start using the functionality provided by means of the fingerprint sensor. For example, the GUI may be specifically adapted to instruct the user on how to enroll a finger for allowing future authentication of the user. However, there also exists electronic equipment that lacks a GUI for providing suitable instructions to the user during the enrollment process, such as a smart card having an integrated fingerprint sensor, for example to be used as an alternative to be using a PIN code. In such a case, the enrollment process must typically involve some form of further electronic equipment, at least to be used for providing instructions to the user during the enrollment of a fingerprint for the user.

An example of such a smart card enrollment process is disclosed in US20050139685, where for example a bank is functioning as an authority for issuing the smart card. Specifically, in US20050139685 the smart card is inserted into a smart card reader being arranged in communication with a computer having a dedicated security mechanism for enrolling the fingerprint of the user.

Using dedicated "enrollment equipment" as proposed in US20050139685 may possibly be costly to provide and support if and when the general population transition from PIN only smart cards to smart cards having integrated fingerprint sensors. In addition, it would be desirable to allow the enrollment process to be somewhat automated, meaning that the amount of manual clerical interaction for authenticating the user during the enrollment process is reduced. Accordingly, there seems to be room for further improvement in securely enrolling a fingerprint of a user with a smart card comprising an integrated fingerprint sensor, specifically from a perspective of cost and user interaction.

SUMMARY

In view of the above-mentioned security problems, it is an object of the present disclosure to provide a simplified method for enrolling a fingerprint of a user with a smart card comprising an integrated fingerprint sensor.

According to an aspect of the present disclosure, it is therefore provided a method of amending a fingerprint template for a user of a smart card, the smart card comprising a fingerprint sensing system including a fingerprint sensor configured for capturing a fingerprint representation of a fingerprint pattern of a finger of a user and processing circuitry connected to and configured to control the operation of the fingerprint sensor, the method comprising the steps of acquiring, using the fingerprint sensor, a partial fingerprint representation of a portion of the user's fingerprint, extracting, using the processing circuitry, fingerprint features from the partial fingerprint representation, forming a set of fingerprint features, determining, using the processing circuitry, a similarity level between the set of extracted fingerprint features and information comprised with the fingerprint template, amending, using the processing circuitry, the fingerprint template to comprise a representation of the set of fingerprint features if the similarity level is above a first threshold level, and amending, using the processing circuitry, the fingerprint template to comprise a representation of the set of fingerprint features if the similarity level is below the first threshold level and a separate credential for the user is determined as valid, wherein the separate credential for the user is received at the processing circuitry from an electronic transaction terminal when the smart card is within a predetermined distance from the electronic transaction terminal.

By means of the present disclosure, it is possible to allow a user to enroll his fingerprint with a smart card without having to use e.g. the above mentioned prior-art enrollment equipment. Rather, in line with the present disclosure the smart card is adapted to provide the user with both of two options for amending a fingerprint template for smart card.

In line with the first option for amending the fingerprint template, the extracted fingerprint features for a "newly" presented fingerprint representation for the user's finger is compared to previously stored corresponding fingerprint features. If the matching is successful, where a determined similarity level is above a first threshold level, the fingerprint template is amended with the fingerprint features of the newly presented fingerprint representation. If the matching level is below the first threshold level it may optionally be possible to discard the fingerprint features of the newly presented fingerprint representation.

In line with the second option for amending the fingerprint template, the extracted fingerprint features for the newly presented fingerprint representation for the user's finger are amended to the fingerprint template based on another determination, where the other determination is determination of if a separate credential for the user, such as a dedicated PIN code for the user, is considered valid. The second option is in line with the present disclosure "activated" if the matching level is below the first threshold level. However, optionally the second option may also be activated in case e.g. the fingerprint template is empty, such as when the smart card is used for the very first time or in case an optional "factory reset" for the smart card is performed.

Advantages following the present disclosure is an improved flexibility and ease for the user to enroll a fingerprint template with the smart card, by the specific configuration of the smart card such that more than a single way of enrollment is made possible. Additionally, since no external specifically dedicated hardware and software is needed, the enrollment may be performed seamless without the user having to e.g. install specific applications (sometimes denoted as "Apps") or similar. The overall initial effort for the user to start using the fingerprint features of the smart card is lowered, in turn improving the overall security of using the smart card. In addition, the user will not have to spend tedious "extra time" for fingerprint enrollment, since the enrollment/fingerprint activation process is performed in the background.

Furthermore, in line with the present disclosure the process for "filling" the fingerprint template with sufficient information to allow a proper verification of the user may be performed in a progressive manner. That is, portions of the user's fingerprint are captured over time (in conjunction with a plurality of consecutive transactions/sessions in relation to e.g. a POS terminal) and essentially in the background while the user for example is performing a normal payment process. For example, each time the user is to perform a transaction, such as for example to pay for a product in a shop, he will at the same time place his finger onto the fingerprint sensor, whereby a partial fingerprint representation of a portion of the user's fingerprint is acquired. The expression PIN code (Personal identification number) should be interpreted broadly and is understood to include any type of information that may be provided using e.g. an input device such as a keyboard, etc.

Processing circuitry comprised with the smart card will in accordance to the present disclosure be adapted to extract fingerprint features from the acquired partial fingerprint representation and try to match those features with previously acquired fingerprint information (features) with the purpose of forming the fingerprint template. Once there has been collected "enough" information during consecutive use of the smart card to allow thereby following proper verification, the fingerprint template is saved together with an identifier for the fingerprint (such as for example a pointer to the user, which finger of the user that has been enrolled, or a general identifier for the user), such as in a digital (preferably encrypted) memory comprised with the smart card.

The determination of when the fingerprint template comprises a sufficient amount of information may for example be determined by an enrollment criterion. The enrollment criterion may in an embodiment be defined as estimated finger coverage for the combined set of extracted fingerprint features. In other embodiments, the number of acquired images or the accumulated number of extracted features may be used in defining the enrollment criteria. As the template is securely stored with the smart card and the enrollment criterion is fulfilled, it may be possible to enabling use of the fingerprint sensor for authenticating the user, for example when performing a payment process, in conjunction with e.g. a POS terminal.

Within the context of the present disclosure, the expression "fingerprint representation" (or fingerprint image) should be interpreted broadly and to include both a regular "visual image" of a fingerprint of a finger as well as a set of measurements relating to the finger when acquired using the fingerprint sensor. A plurality of fingerprint images may be subsequently acquired and fused together during a single session, where the resulting information is used as an input for determining the sets of features.

It should be understood that the fingerprint sensor preferably is a fingerprint touch sensor; however, the present disclosure may also be implemented using e.g. a swipe fingerprint sensor. The fingerprint sensor may be implemented using any kind of current or future fingerprint sensing principle, including for example capacitive, optical, or thermal sensing technology. However, at present capacitive sensing is most preferred. Both one and two-dimensional sensors are possible and within the scope of the present disclosure.

The expression "processing circuitry" as used above should be understood to include any type of computing device, such as an ASIC, a micro-processor, etc. It should also be understood that the actual implementation of such a processing circuitry may be divided between more than a single device/circuit.

The smart card may in one preferred embodiment be a hybrid smart card, implementing both of contactless and contact interfaces (electrical contact pads) on a single card. Accordingly, for achieving the contactless interface the smart card may further comprise a wireless transceiver for wireless communication with the electronic transaction terminal, such as for example the above-mentioned POS terminal. The wireless transceiver may for example be adapted for at least one of Bluetooth, Wi-Fi, and NFC communication. The wireless functionality could possibly be limited to use only once the user has enrolled his fingerprint with the smart card, for example for payment purposes as is known within the technical area of the present disclosure.

In some embodiments, the fingerprint template is only amended if the smart card is arranged in a vicinity of the POS terminal, such as within a predetermined distance from the POS terminal. Such an implementation will of course provide further security to the activation process, reducing the risks with e.g. a hacker trying to falsely activate the fingerprint functionality for the smart card. The predetermined distance may in some embodiment of the present disclosure for example be set based on an "NFC field" provided by the electronic transaction terminal and used by the smart card.

It should however be understood that the smart card may be provided with means, such as contact pads, for allowing the smart card to be electrically connected to e.g. the POS terminal. In some embodiments it may be possible to only allow the fingerprint template to be amended using the separate credential if the smart card is arranged in electrical contact with the POS terminal.

In such an embodiment, it may be possible for the user to interact with the POS terminal for performing the multi-step fingerprint activation according to the present disclosure as well as for performing the transaction, e.g. for payment of the purchased service or product.

In one embodiment of the present disclosure the first threshold level may be made dependent on a determined number of acquired partial fingerprint representations or based on a determined completion level for the fingerprint template. That is, in an initial phase of enrolling the user's fingerprint with the smart card the similarity level may be allowed to be slightly lower as compared to once the amount of information comprised with the fingerprint template has increase. That said, it is desirable to still ensure that the first threshold level is "high enough" even from the start, thereby reducing the risk of "poisoning" the fingerprint template with multiple fingers, fingers of another (different) user, etc.

The first threshold level may also be made dependent on other factors, such as to allow the first threshold level to be dependent on a duration between subsequently acquired partial fingerprint representations. For example, in case the user "leaves" the smart card in state where the enrollment hasn't been completed, it may be desirable to again lower the first threshold level. That is, in case the duration between subsequently acquired partial fingerprint representations is short, then the fingerprint representations are expected to be fairly similar, whereby the first threshold level may be kept, in comparison higher as when the duration between subsequently acquired partial fingerprint representations is long.

In an embodiment, the smart card further comprises a user interface for informing the user if the separate credential, e.g. the PIN code, is to be provided. The user interface is in one embodiment an indicator lighting device, such as an LED integrated with a surface of the smart card. Accordingly, the POS terminal must not necessarily be specifically adapted to handle the functionalities according to the present disclosure. The "added" user interaction may instead be provided using e.g. the LED. In one embodiment the LED (or an additional LED) may also be for indicating an intermediate status within the enrollment/fingerprint activation process.

Preferably, the method according to the present disclosure further comprises the step of authenticating the user if the similarity level is above a second threshold, wherein the second threshold is equal to or below the first threshold. That is, once the enrollment phase has been completed, it may in some embodiment be allowed to lower the threshold, i.e. below the first threshold, when authenticating the user. As such, a higher threshold is used during enrollment/filling the template as compared to general use of the smart card. In a similar manner as discussed above, having an in comparison high first threshold level may ensure that the template is not poisoned with erroneous information.

In an embodiment of the present disclosure, the smart card may be "locked" once the fingerprint authentication functionality has been completed. Accordingly, the smart card may in such an implementation not be allowed to be reconfigured for another user/finger. It should be understood that locking also may be done in case authentication attempts failed reaches an unacceptable level. However, it should be understood that the smart card still may be adapted for allowing an update of the template to take place, even after enabling fingerprint authentication and possibly also if the smart card has been locked. Template update may for example be performed in case it is detected that the fingerprint pattern of (a rightful and authenticated) user has slightly changed. The template update is thereby used for "tracking" a change (such as a scar, etc.) in the fingerprint pattern of the user's finger.

According to another aspect of the present disclosure, there is provided a smart card comprising a fingerprint sensing system including a fingerprint sensor configured for capturing a fingerprint representation of a fingerprint pattern of a finger of a user, and processing circuitry connected to and configured to control the operation of the fingerprint sensor, wherein the processing circuitry is adapted to acquire a partial fingerprint representation of a portion of the user's fingerprint using the fingerprint sensor, extract fingerprint features from the partial fingerprint representation, forming a set of fingerprint features, determine a similarity level between the set of extracted fingerprint features and information comprised with the fingerprint template, amend the fingerprint template to comprise a representation of the set of fingerprint features if the similarity level is above a first threshold level, and amending, using the processing circuitry, the fingerprint template to comprise a representation of the set of fingerprint features if the similarity level is below the first threshold level and a separate credential for the user is determined as valid, wherein the separate credential for the user is received at the processing circuitry from an electronic transaction terminal when the smart card is within a predetermined distance from the electronic transaction terminal. This aspect of the present disclosure provides similar advantages as discussed above in relation to the previous aspect of the present disclosure.

In accordance to a still further aspect of the present disclosure there is provided a computer program product comprising a non-transitory computer readable medium having stored thereon computer program means for amending a fingerprint template for a user of a smart card, the smart card comprising a fingerprint sensing system including a fingerprint sensor configured for capturing a fingerprint representation of a fingerprint pattern of a finger of a user and processing circuitry connected to and configured to control the operation of the fingerprint sensor, the computer program product comprising code for acquiring, using the fingerprint sensor, a partial fingerprint representation of a portion of the user's fingerprint, code for extracting, using the processing circuitry, fingerprint features from the partial fingerprint representation for forming a set of fingerprint features, code for determining, using the processing circuitry, a similarity level between the set of extracted fingerprint features and information comprised with the fingerprint template, code for amending, using the processing circuitry, the fingerprint template to comprise a representation of the set of fingerprint features if the similarity level is above a first threshold level, and amending, using the processing circuitry, the fingerprint template to comprise a representation of the set of fingerprint features if the similarity level is below the first threshold level and a separate credential for the user is determined as valid, wherein the separate credential for the user is received at the processing circuitry from an electronic transaction terminal when the smart card is within a predetermined distance from the electronic transaction terminal. Also this aspect of the present disclosure provides similar advantages as discussed above in relation to the previous aspects of the present disclosure.

Further features of, and advantages with, the present disclosure will become apparent when studying the appended claims and the following description. The skilled person realize that different features of the present disclosure may be combined to create embodiments other than those described in the following, without departing from the scope of the present disclosure.

BRIEF DESCRIPTION OF THE DRAWINGS

The various aspects of the present disclosure, including its particular features and advantages, will be readily understood from the following detailed description and the accompanying drawings, in which.

DETAILED DESCRIPTION

The present disclosure will now be described more fully hereinafter with reference to the accompanying drawings, in which currently preferred embodiments of the present disclosure are shown. This present disclosure may, however, be embodied in many different forms and should not be construed as limited to the embodiments set forth herein; rather, these embodiments are provided for thoroughness and completeness, and fully convey the scope of the present disclosure to the skilled person. Like reference characters refer to like elements throughout.

Figure 1:
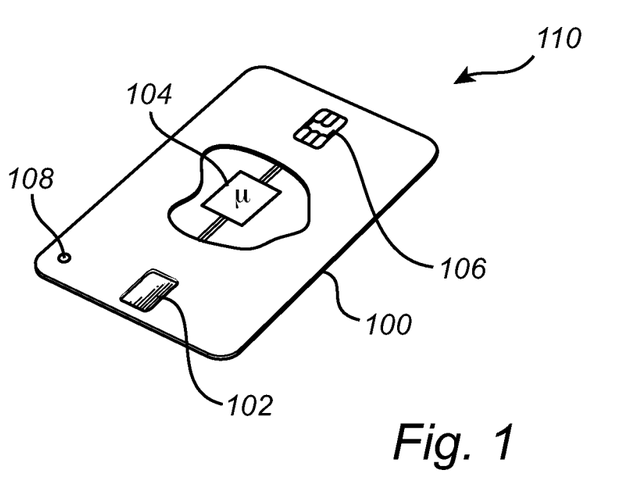
FIG. 1 schematically illustrates a smart card to be used in conjunction with the enrollment scheme according to the present disclosure.
Figure 3A:
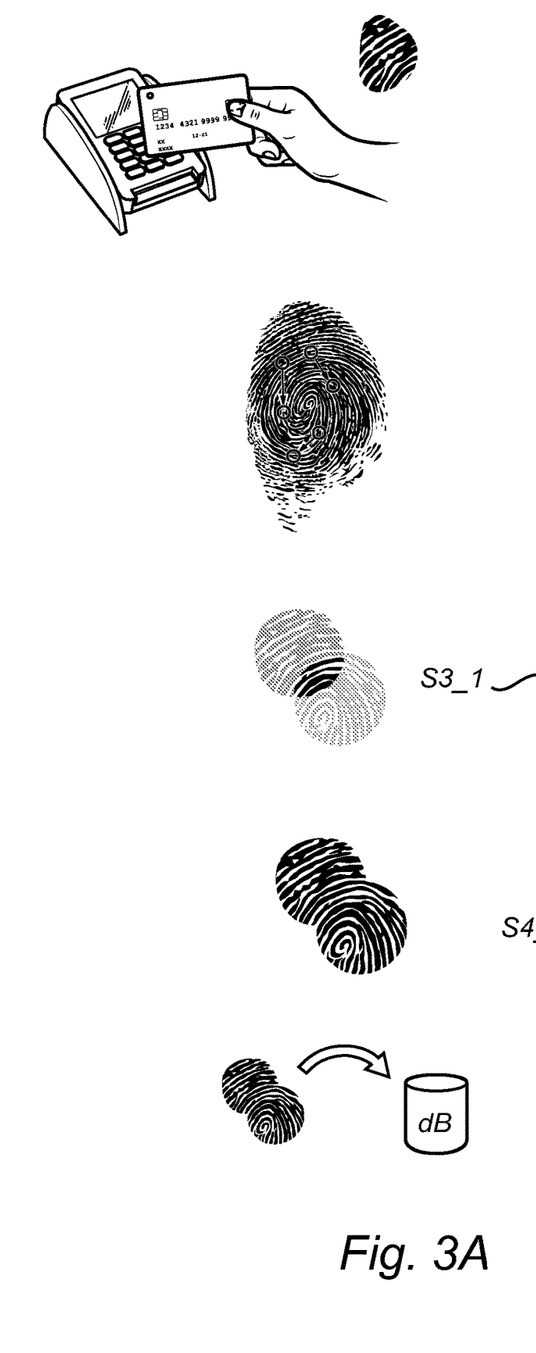
FIGS. 3A and 3B conceptually shows user interaction with the smart card and a POS terminal for fingerprint activation of the smart card, and FIGS. 4 and 4B provides a flowchart illustrating the exemplary steps of the present disclosure for fingerprint enrollment of a user with a smart card.
Figure 3B:
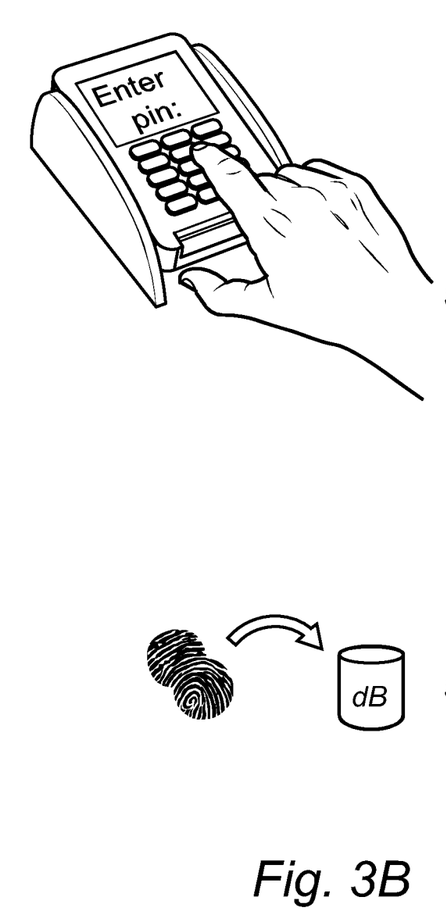

Turning now to the drawings and to FIG. 1 in particular, there is schematically illustrated a smart card carrier 100 integrating a fingerprint sensing system including a fingerprint sensor 102 including a plurality of sensing elements and configured for capturing a fingerprint representation of a fingerprint pattern of a finger of a user, as well as a processing circuitry 104 connected to and configured to control the operation of the fingerprint sensor 102. In this embodiment the fingerprint sensor 102 is arranged on the front side of the smart card 100. However, the fingerprint sensor 102 may as an alternative (or also) be provided on a back side of the smart card carrier 100. The fingerprint sensor 102 may, for example, be used for authenticating the user when performing a payment and/or transaction, for example allowing the smart card 100, once the finger of the user has been enrolled, to interact with a POS terminal (as seen in FIGS. 3A and 3B). Furthermore, the smart card carrier 100 may integrate a plurality of contact pads 106 electrically connected to at least the processing circuitry 104, possibly allowing for providing a wired connection with the POS terminal if/when the smart card carrier 100 is inserted in a card slot provided with the POS terminal.

In addition, the smart card carrier 100 may in some embodiments also include a user interface, such as for example a light source 108 (e.g. a light emitting diode, LED) integrated with the smart card carrier 100 and arranged in electrical connection with the processing circuitry 104. Still further, the smart card carrier 100 preferably comprises means (not shown) for allowing wireless interaction with the POS terminal, such as adapted for allowing near field communication (NFC) between the smart card carrier 100 and the POS terminal. Accordingly, in using wireless communication the user need not insert the smart card carrier 100 into the card slot of the POS terminal. The NFC connection between the smart card carrier 100 and the POS terminal may further be used for providing electrical power to the smart card carrier 100, in a manner known to the skilled person.

The smart card carrier 100 forms together with the fingerprint sensor 102, the processing circuitry 104, etc., a smart card system 110.

The processing circuitry 104 further comprises a memory, such as a database, e.g. for storing one or a plurality of fingerprint template for one or a plurality of fingers for the user. The processing circuitry 104 may each include a microprocessor, microcontroller, programmable digital signal processor or another programmable device. The processing circuitry 104 may also, or instead, each include an application specific integrated circuit, a programmable gate array or programmable array logic, a programmable logic device, or a digital signal processor. Where the processing circuitry 104 includes a programmable device such as the microprocessor, microcontroller or programmable digital signal processor mentioned above, the processor may further include computer executable code that controls operation of the programmable device. It should be understood that all or some parts of the functionality provided by means of the processing circuitry 104 (or generally discussed as "processing circuitry") may be at least partly integrated with the fingerprint sensor 102.

Figure 2:
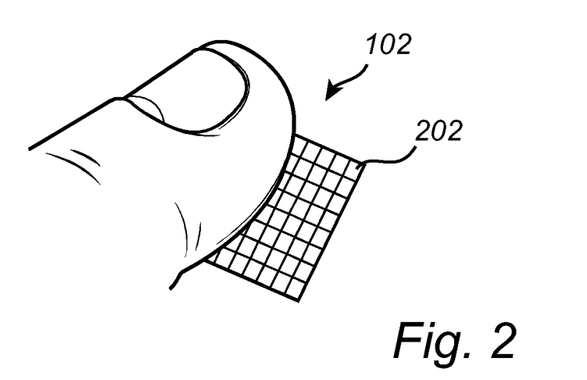
FIG. 2 exemplifies a fingerprint sensor integrated with the inventive smart card.

With further reference to FIG. 2, there is conceptually illustrated a somewhat enlarged view of the fingerprint sensor 102. In the case of employing a capacitive sensing technology, the fingerprint sensor 102 is configured to comprise a large plurality of sensing elements, preferably arranged as a two-dimensional array. The two-dimensional array may have sizes depending on the planned implementation and in an embodiment 160×160 pixels are used. Other sizes are of course possible and within the scope of the present disclosure, including two-dimensional array with less pixels as compared to the above example. A single sensing element (also denoted as a pixel) is in FIG. 2 indicated by reference numeral 202.

Figure 4A:
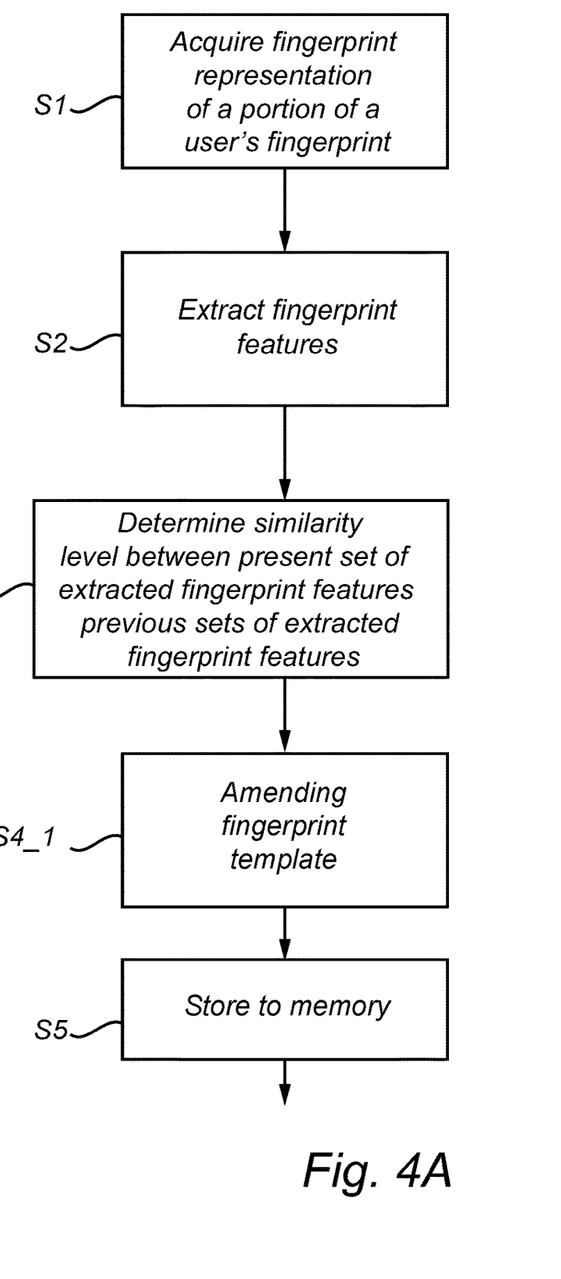
Figure 4B:
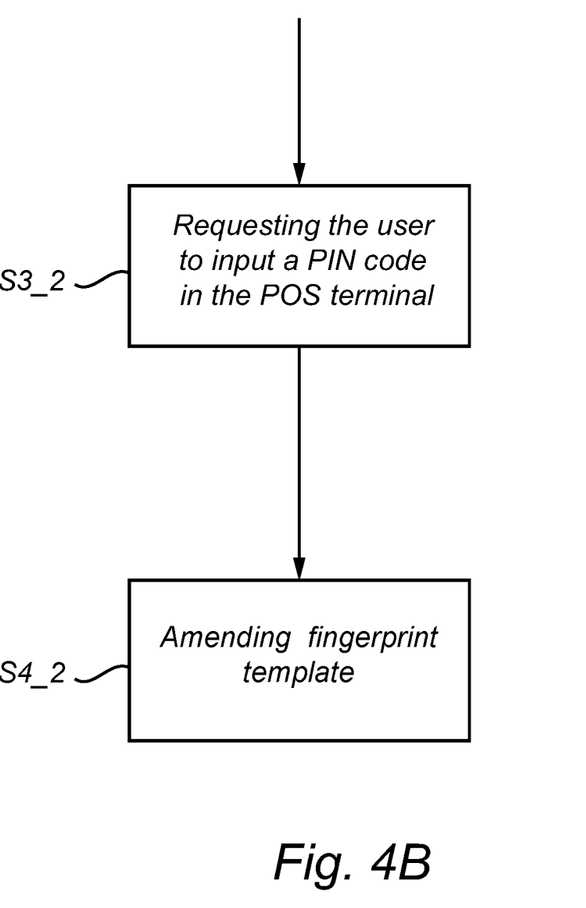

Turning now to FIGS. 3A and 3B in conjunction with FIGS. 4A and 4B, there is conceptually illustrated a portion of multi-step activation of fingerprint authentication for a user of the smart card system 110, as defined by the present disclosure. Typically, the process for the user starts with the user receiving a "new" and un-enrolled smart card system 110. Accordingly, the possibility of using the fingerprint functionality provided with the smart card has not yet been activated. In a possible embodiment of the present disclosure, the user receives the smart card system 110 and a thereto related PIN code in two separate letters from e.g. a bank or other authority. Thus, the smart card system 110 is possibly some form of bank card, such as a debit or credit card. The smart card may also be an entry card, ID card, etc.

When the user for the first time uses hos new smart card for paying for a purchase, for example in a shop, he will be instructed within e.g. a display element of the POS terminal to arrange the smart card system 110 within an "NFC field" provided by the POS terminal, for example extending a predetermined distance from the POS terminal, preferably in close vicinity of the POS terminal. In a possible non-limiting embodiment, the NFC field extends from around 0-40 cm from the POS terminal. It may in a corresponding manner be possible to instruct the user to partly insert the smart card within the POS terminal, to enable an electrical connection between the plurality of contact pads 106 and the POS terminal.

Once within the NFC field (or an electrical connection has been enabled), a wireless transaction session is initiated between the smart card system 110 and the POS terminal. Preferably, when the smart card 102 is still within the NFC field of the POS terminal and the user place a selected finger on the fingerprint sensor 102, the fingerprint sensor 102 will acquire, S1, a partial fingerprint representation of a portion of the user's fingerprint. The processing circuitry 104 will subsequently extract, S2, fingerprint features from the partial fingerprint representation, forming a present set of fingerprint features.

As this is the first time the fingerprint sensor 102 is acquiring fingerprint information in regards to the user, no previous fingerprint data is typically stored with the smart card system 110. Accordingly, the second option for amending the fingerprint template is activated, whereby the user will be requested, S3_2, using the display element or the LED 108 to provide a separate credential, such as the PIN code. The PIN code is for example provided using a keyboard or other user interface comprised with the POS terminal. If the PIN code is determined to be valid, the fingerprint template will be amended, S4_2, with the extracted fingerprint features, thereby stored, S5, within the above-mentioned memory e.g. related to the processing circuitry 104.

The next time the user is to interact with a POS terminal (not necessarily the same as the first time and not necessarily at the same store), the process of acquiring partial fingerprint representation of a portion of the user's fingerprint and extracting fingerprint features is again performed. However, as the smart card system 110 at this subsequent use has previously stored fingerprint features (i.e. features) comprised with the fingerprint template, it is now possible to activate option one for amending the fingerprint template, by performing the step of determining, S3_1, a similarity level between the set of extracted fingerprint features and information already comprised with the fingerprint template.

If the similarity level is determined to be above a first threshold level, fingerprint template will be amended, S4_1, with the extracted fingerprint features without the user having to input the PIN code. Accordingly, the smart card system 110 will in line with the present disclosure automatically adapt the enrollment strategy dependent on what information that is presently comprised with the fingerprint template.

However, if the similarity level is determined to be below the first threshold level, it is again possible to activate option two, whereby the user is requested to input his PIN code. In a similar manner as in regards to the above discussion, the fingerprint template will only be amended with the extracted fingerprint features in case the PIN code has been determined to be valid.

Once a "sufficient" number of fingerprint features have been collected for the selected finger of the user, possibly based on an estimation of a coverage area of the user's finger, the fingerprint template is completed and saved with the smart card system 110.

In accordance to the present disclosure it may in this stage, optionally, be desirable to request the user to again input the PIN code (being the same or a different PIN code as compared to the general PIN code used with the smart card system 110). This step obviously creates an extra layer of security for allowing the enrollment to fully complete. The extra layer of security could also or alternatively be achieved by means of another type of identification of the user, for example using an identity card to be reviewed by a shop employee or similar. The fingerprint activation string may also be a general password provided to the user. It may be desirable to require that the smart card system 110 stays within the above-mentioned NFC field also when entering the PIN code or similar, or by requesting the smart card system 110 is arranged in electrical contact with the POS terminal.

It should be understood that it may be possible, and within the scope of the present disclosure to request the user to enter the fingerprint activation string or PIN code each time (e.g. before) the fingerprint sensor acquired information during the fingerprint activation process.

Once the above-mentioned optional step has been completed it may be possible to enable fingerprint authentication for the user of the smart card system 110, possibly including informing the user by means of flashing the light source 108, for example in a green color. Accordingly, once fingerprint authentication has been enabled, the user will be able to perform e.g. a purchase and authenticate the purchase by placing his (selected) finger at the fingerprint sensor 102. During the authentication process, fingerprint information is acquired using the fingerprint sensor 102 and processed by the processing circuitry 104, including a matching with the fingerprint template. If a matching is conformed, the authentication is performed, and the payment will be made.

As mentioned above, the smart card system 110 may be locked once the fingerprint activation has been completed, meaning that it may be possible to disallow any further enrollment procedures to take place.

The control functionality of the present disclosure may be implemented using existing computer processors, or by a special purpose computer processor for an appropriate system, incorporated for this or another purpose, or by a hardwire system. Embodiments within the scope of the present disclosure include program products comprising machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general-purpose computer, special purpose computer, or special purpose processing machines to perform a certain function or group of functions.

Although the figures may show a sequence the order of the steps may differ from what is depicted. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps. Additionally, even though the present disclosure has been described with reference to specific exemplifying embodiments thereof, many different alterations, modifications and the like will become apparent for those skilled in the art.

In addition, variations to the disclosed embodiments can be understood and effected by the skilled addressee in practicing the claimed present disclosure, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A method of amending a fingerprint template for a user of a smart card, the smart card comprising a fingerprint sensing system including a fingerprint sensor configured for capturing a fingerprint representation of a fingerprint pattern of a finger of a user and processing circuitry connected to and configured to control the operation of the fingerprint sensor, the method comprising the steps of:
- acquiring, using the fingerprint sensor, a partial fingerprint representation of a portion of the user's fingerprint,
- extracting, using the processing circuitry, fingerprint features from the partial fingerprint representation, forming a set of fingerprint features,
- determining, using the processing circuitry, a similarity level between the set of extracted fingerprint features and information comprised with the fingerprint template,
- amending, using the processing circuitry, the fingerprint template to comprise a representation of the set of fingerprint features if the similarity level is above a first threshold level, and
- amending, using the processing circuitry, the fingerprint template to comprise a representation of the set of fingerprint features if the similarity level is below the first threshold level and a separate credential for the user is determined as valid,
- wherein the separate credential for the user is received at the processing circuitry from an electronic transaction terminal when the smart card is within a predetermined distance from the electronic transaction terminal.

2. The method according to claim 1, wherein the separate credential for the user is a PIN code.

3. The method according to claim 1, wherein the first threshold level is dependent on a determined number of acquired partial fingerprint representations.

4. The method according to claim 1, wherein the first threshold level is dependent on a determined completion level for the fingerprint template.

5. The method according to claim 1, wherein the first threshold level is dependent on a duration between subsequently acquired partial fingerprint representations.

6. The method according to claim 1, wherein the electronic transaction terminal is a POS terminal.

7. The method according to claim 1, wherein the smart card comprises an indicator lighting device and the method further comprises the step of:
- activating the indicator lighting device only if the separate credential for the user is determined as valid.

8. The method according to claim 1, further comprising the step of:
- authenticating the user if the similarity level is above a second threshold,
- wherein the second threshold is equal to or below the first threshold.

9. The method according to claim 1, further comprising the step of:
- automatically providing the user with a request to provide the separate credential if no information is comprised with the fingerprint template.

10. A smart card comprising a fingerprint sensing system including a fingerprint sensor configured for capturing a fingerprint representation of a fingerprint pattern of a finger of a user, and processing circuitry connected to and configured to control the operation of the fingerprint sensor, wherein the processing circuitry is adapted to:
- acquire a partial fingerprint representation of a portion of the user's fingerprint using the fingerprint sensor,
- extract fingerprint features from the partial fingerprint representation, forming a set of fingerprint features,
- determine a similarity level between the set of extracted fingerprint features and information comprised with the fingerprint template,
- amend the fingerprint template to comprise a representation of the set of fingerprint features if the similarity level is above a first threshold level, and
- amending, using the processing circuitry, the fingerprint template to comprise a representation of the set of fingerprint features if the similarity level is below the first threshold level and a separate credential for the user is determined as valid,
- wherein the separate credential for the user is received at the processing circuitry from an electronic transaction terminal when the smart card is within a predetermined distance from the electronic transaction terminal.

11. The smart card according to claim 10, wherein the fingerprint sensor is a capacitive fingerprint sensor.

12. The smart card according to claim 10, further comprising a wireless transceiver for wireless communication with the electronic transaction terminal.

13. A computer program product comprising a non-transitory computer readable medium having stored thereon computer program means for amending a fingerprint template for a user of a smart card, the smart card comprising a fingerprint sensing system including a fingerprint sensor configured for capturing a fingerprint representation of a fingerprint pattern of a finger of a user and processing circuitry connected to and configured to control the operation of the fingerprint sensor, the computer program product comprising:
- code for acquiring, using the fingerprint sensor, a partial fingerprint representation of a portion of the user's fingerprint,
- code for extracting, using the processing circuitry, fingerprint features from the partial fingerprint representation for forming a set of fingerprint features,
- code for determining, using the processing circuitry, a similarity level between the set of extracted fingerprint features and information comprised with the fingerprint template,
- code for amending, using the processing circuitry, the fingerprint template to comprise a representation of the set of fingerprint features if the similarity level is above a first threshold level, and
- amending, using the processing circuitry, the fingerprint template to comprise a representation of the set of fingerprint features if the similarity level is below the first threshold level and a separate credential for the user is determined as valid,
- wherein the separate credential for the user is received at the processing circuitry from an electronic transaction terminal when the smart card is within a predetermined distance from the electronic transaction terminal.

* * * * *